United States Patent Office 2,981,602
Patented Apr. 25, 1961

2,981,602
PREPARATION OF DEUTERIUM FLUORIDE

George A. Olah and Stephen J. Kuhn, Sarnia, Ontario, Canada, assignors to The Dow Chemical Company, Midland, Mich., a corporation of Delaware No Drawing. Filed Mar. 23, 1959, Ser. No. 800,969

6 Claims. (Cl. 23—153)

The present application is a continuation-in-part of our copending application, Serial No. 695,237 filed November 8, 1957, now abandoned.

This invention relates to an improved method of preparing deuterium fluoride and is especially related to a method of preparing deuterium fluoride by the reaction of deuterium oxide with a fluorine-containing compound.

It is the object of this invention to provide a simple method of preparing deuterium fluoride.

It is a further object of this invention to provide a method of preparing deuterium fluoride directly from deuterium oxide avoiding the intermediate step of preparing deuterium or deuterium sulfate.

Heretofore deuterium fluoride has been prepared by the reaction of deuterium with silver fluoride; by the reaction of deuterium with elemental fluorine; by the reaction of deuterium sulfate with calcium fluoride; or by the reaction of deuterium sulfate with sodium fluoride. All these preparations are based on the primary preparation of deuterium or deuterium sulfate and can be effected only with some preparative difficulties.

We have now found that the deuterolysis of certain fluorine-containing compounds which are reactive with $D_2O$ to produce DF provides a convenient, simple method for the preparation of substantially anhydrous deuterium fluoride.

Suitable fluorine-containing compounds include thionyl fluoride and carbonyl fluoride which react as follows:

$$SOF_2 + D_2O = SO_2 + 2DF$$
$$COF_2 + D_2O = CO_2 + 2DF$$

Alkyl acyl and aryl alkyl acyl fluorides may be used but only half the deuterium in deuterium oxide is converted to the fluoride as illustrated by the following equations:

$$HCOF + D_2O = HCOOD + DF$$
$$CH_3COF + D_2O = CH_3COOD + DF$$
$$CH_3CH_2COF + D_2O = CH_3CH_2COOD + DF$$

Aroyl and alkaroyl fluorides, on the other hand, such as benzoyl fluoride, if used in large excess of the stoichiometric amount react with deuterium oxide to produce nearly quantitative amounts of deuterium fluoride as demonstrated in the following equations:

$$C_6H_5COF + D_2O = C_6H_5COOD + DF$$
$$C_6H_5COF + C_6H_5COOD = (C_6H_5CO)_2O + DF$$

Alkyl sulfonyl fluorides and fluosulfonic acid may also be used as illustrated in the following equations for the reaction of methane sulfonyl fluoride and fluosulfonic acid, respectively with deuterium oxide. However, $$CH_3SO_2F + D_2O = CH_3SO_3D + DF$$
$$FSO_3H + D_2O = DHSO_4 + DF$$

half of the deuterium is then tied up as the sulfate.

Of the above described deuterolyzable fluorine-containing compounds benzoyl fluoride is to be preferred if it is essential to convert substantially all of a given amount of $D_2O$ to DF but fluosulfonic acid is desirably used wherein the economics of DF production dictates the use of a lower cost fluorine-containing compound.

In carrying out the invention a material, having as its major component deuterium oxide, is reacted with at least the stoichiometric amount, based on the weight of deuterium oxide in the material, of a fluorine-containing compound selected from the group consisting of thionyl fluoride, carbonyl fluoride, fluosulfonic acid, alkyl sulfonyl fluorides, and acyl fluorides, preferably under anhydrous conditions in a reaction vessel which may be of stainless steel, quartz, or silver construction as desired. The reaction is carried out at a temperature of at least 50° C. for a time sufficient for deuterolysis to approach completion. After the reaction period the formed deuterium fluoride is distilled off and then redistilled at least once, as in an all silver apparatus. Since for most purposes a substantially pure grade of deuterium fluoride is much more desirable and useful than an impure grade, it is to be expected that deuterium oxide of better than 95 percent purity will normally be employed as a starting material. If anhydrous conditions are carefully maintained throughout the preparation a product of better than 99.5 percent purity is obtainable.

The following examples serve to illustrate the practice of the invention.

Example I 168 g. (1.5 mole) benzoylfluoride was deuterolyzed in an all silver apparatus with 5 g. (0.25 mole) $D_2O$ (99.5 percent) at 65–70° C. The formed DF was distilled in a cooled receiver and twice redistilled to remove any organic contamination. Yield 9.7 g. deuterium fluoride (92 percent of the theoretical amount). $B.P._{762} = 18.5°$ C. F content calculated 90.5 percent; found 90.3 percent; D content calculated 9.5 percent; found 9.2 percent.

Example II 12 g. (0.25 mole) formylfluoride was put in a 200 ml. stainless steel autoclave and heated with 5 g. (0.25 mole) heavy water (99.5 percent $D_2O$) to 50° C. for one hour, during efficient shaking. After completing the reaction the deuterium fluoride formed was distilled over in a silver apparatus and redistilled to remove formyl fluoride and formic acid carried over during the first distillation. Yield was 4.2 g. deuterium fluoride, which represents use of 40 percent of the deuterium present, as an equimolar quantity of HCOOD was also formed and during the separation some DF is lost by dissolving in formic acid.

Example III 33 g. (0.5 mole) of carbonyl fluoride is condensed in a 200 ml. stainless steel autoclave and after adding 5 g. (0.25 mole) of heavy water (99.5 percent $D_2O$), during efficient shaking the autoclave is heated to 50° C. for two hours. The excess of carbonyl fluoride and the carbon dioxide formed are then distilled off from the autoclave and the deuterium fluoride twice distilled in an all silver apparatus. Yield 9.4 g. deuterium fluoride (90 percent of the theoretical amount).

Example IV 20 g. (1 mole) of deuterium oxide (99.6 percent $D_2O$) was added dropwise into an excess of fluosulfonic acid in an all quartz distillation apparatus. The rate of addition of $D_2O$ was such that the heat of reaction maintained the temperature of the reaction mixture in the range of 50 to 70° C., temporary cooling being employed as necessary. The deuterium fluoride distilled off continuously as formed and was collected in a quartz receiver cooled in Dry Ice. After the $D_2O$ addition was completed the acid mixture was warmed to 100° C. for a half hour to completely react any residual $D_2O$ and remove all the deuterium fluoride. The deuterium fluoride collected was redistilled in a quartz distillation apparatus. Yield 19 g. deuterium fluoride (95 percent of the theoretical amount).

What is claimed is:

1. An improved method for the preparation of deuterium fluoride comprising reacting substantially pure deuterium oxide with at least a stoichiometrical amount of fluorine-containing compound selected from the group consisting of thionyl fluoride, carbonyl fluoride, fluosulfonic acid, lower alkyl sulfonyl fluorides, lower alkyl acyl fluorides and lower aryl and alkaryl acyl fluorides, at a temperature of at least 50° C. and for a time sufficient for the deuterolysis reaction to approach completion.

2. A method as in claim 1 in which the fluorine-containing compound is benzoyl fluoride and the reaction temperature is at least 60° C.

3. A method as in claim 1 in which the fluorine-containing compound is carbonyl fluoride.

4. A method as in claim 1 in which the fluorine-containing compound is a lower alkaryl acyl fluoride.

5. An improved method for the preparation of deuterium fluoride comprising reacting substantially pure deuterium oxide with at least a stoichiometeric amount of a fluorine-containing compound selected from the group consisting of thionyl fluoride, carbonyl fluoride, fluosulfonic acid, lower alkyl sulfonyl fluorides, lower alkyl acyl fluorides and lower aryl and alkaryl acyl fluorides, at a temperature of at least 50° C. and for a time sufficient for the deuterolysis reaction to approach completion.

6. A method as in claim 1 in which the fluorine-containing compound is fluosulfonic acid.

References Cited in the file of this patent

UNITED STATES PATENTS

| 2,681,883 | Hiskey | June 22, 1954 |
| 2,702,233 | Mitchell et al. | Feb. 15, 1955 |

OTHER REFERENCES

Ruff et al.: "Das Kohlenoxyfluorid COF$_2$," Zeitschrift für anorganische und allgemeine Chemie, Verlag von Leopold Voss, Leipzig, Band. 221, 1934–1935, pages 154–160.